United States Patent [19]
Koide et al.

[11] Patent Number: 5,415,428
[45] Date of Patent: May 16, 1995

[54] AIR BAG COVER STRUCTURE

[75] Inventors: Teruhiko Koide; Mitsuo Inukai, both of Aichi, Japan

[73] Assignee: Kabushiki Kaisha Tokai-Rika-Denki-Seisakusho, Aichi, Japan

[21] Appl. No.: 105,575

[22] Filed: Aug. 13, 1993

[30] Foreign Application Priority Data

Aug. 19, 1992 [JP] Japan .............................. 4-058187 U

[51] Int. Cl.$^6$ ............................................. B60R 21/16
[52] U.S. Cl. ................................................. 280/728.3
[58] Field of Search ........... 280/728 R, 728 A, 728 B, 280/732, 731

[56] References Cited

U.S. PATENT DOCUMENTS

| | | | |
|---|---|---|---|
| 4,852,907 | 8/1989 | Shiraki et al. | 28/728 B |
| 5,056,814 | 10/1991 | Shiraki et al. | 280/728 B |
| 5,069,477 | 12/1991 | Shiraki | 280/728 B |
| 5,203,586 | 4/1993 | Niwa et al. | 280/728 B |
| 5,320,380 | 6/1994 | Hamada et al. | 280/728 B |

FOREIGN PATENT DOCUMENTS 0328052  11/1992  Japan ................................ 280/728 B Primary Examiner—Margaret A. Focarino
Assistant Examiner—Paul N. Dickson
Attorney, Agent, or Firm—Fisher & Associates

[57] ABSTRACT

An air bag cover structure comprising an air bag cover main body and an insert member. The air bag cover main body has an upper wall portion, a bag body which inflates toward a vehicle occupant when a vehicle suddenly decelerates being accommodated between the upper wall portion and a base plate, the upper wall portion being pushed by the bag body, which is expanding, so that the upper wall portion unfolds, and the air bag cover main body having a side wall portion which includes a center of unfolding of the upper wall portion when the upper wall portion unfolds. The insert member has a first insert portions, which is embedded in the air bag cover main body by insert molding and which is positioned at the upper wall portion when the first insert portion is in an embedded state, and a second insert portion, which is provided integrally with the first insert portion and which is positioned at the side wall portion so as to be supported by the base plate when the second insert portion is embedded in the air bag cover main body. The length of the second insert portion in a direction substantially along the axis of the unfolding center narrows from the position at which the first insert portion and the second insert portion are connected.

20 Claims, 8 Drawing Sheets

AIR BAG COVER STRUCTURE

BACKGROUND OF THE INVENTION

1. Field of the Invention

This invention relates to a structure of an air bag cover which has an air bag cover main body rupturable by the expansion of an air bag outward toward an occupant of a vehicle at the time when the vehicle suddenly decelerates, and an insert member embedded in the air bag cover main body by means of insert molding.

2. Description of the Related Art

An air bag apparatus of the type which is installed, for example, in a steering wheel of a vehicle, is provided with an air bag cover made of a resin such as urethane with decorative outer surfaces (hereinafter referred to as "design surfaces"). Between the air bag cover and the base plate Of the air bag apparatus an air bag is accommodated which expands outward toward an occupant of the vehicle when the vehicle suddenly decelerates.

Recently, as shown in FIG. 6, some air bag covers 100 have arch-shaped design surfaces. FIG. 6 shows a cross-sectional view of a box-shaped air bag cover 100 along a plane roughly parallel to the upper wall (not shown) of the air bag cover 100. In such an air bag cover 100, when the upper wall is ruptured, the upper wall is subdivided into two sections which open like a biparting door upward and downward, respectively, as viewed in FIG. 6. Hinge portions 100A act as pivots for the opening movement of the divided sections of the upper wall, and have an arched cross section. Accordingly, hinge portions of insert plate 102 embedded in the air bag cover 100 must be formed so as to have an arched cross section corresponding to that of the hinge portions 100A of the air bag cover 100.

However, when an air bag cover 100 having convexly arched design surfaces is employed, the rigidity of the inset plate 102 must be taken into consideration.

The air bag cover 104 shown in FIG. 7 has been proposed, in which each of the hinge portions 104A is designed to have a convexly arched design surface while having a straight or flat inner surface. In such design, it becomes possible to employ an insert plate 106, embedded in the air bag cover 104, which has a straight cross section at locations corresponding to the hinge portions 104A. Since the thickness P of the hinge portions 104A between the outer surfaces of the insert plate 106 and the corresponding outer surfaces of the hinge portions is large, the rigidity of such portions must also be taken into consideration.

Taking the above into consideration, an air bag cover 108 shown in FIG. 8 is now employed, which has flat design surfaces. This design eliminates the necessity of arching the insert plate 110 at portions corresponding to the hinge portions 108A, and makes the thickness of the hinge portions 108A thinner.

However, in cases where the above-mentioned air bag cover 108 is employed, it becomes impossible to meet the initial requirement for providing the air bag cover 108 with convexly arched design surfaces, whereby the flexibility in designing the design surfaces of the air bag cover is diminished.

SUMMARY OF THE INVENTION

In view of the aforementioned, an object of the present invention is to provide an air bag cover structure in which the degrees of freedom in design can be increased.

The present invention is an air bag cover structure comprising: an air bag cover main body having an upper wall portion, a bag body which inflates toward a vehicle occupant when a vehicle suddenly decelerates being accommodated between the upper wall portion and a base plate, the upper wall portion being pushed by a bag body, which is expanding, so that the upper wall portion unfolds, and the air bag cover main body having a side wall portion which includes a center of unfolding of the upper wall portion when the upper wall portion unfolds; and an insert member having a first insert portion, which is embedded in the air bag cover main body by insert molding and which is positioned at the upper wall portion when the first insert portion is in an embedded state, and a second insert portion, which is provided integrally with the first insert portion and which is positioned at the side wall portion so as to be supported by the base plate when the second insert portion is embedded in the air bag cover main body; wherein the length of the second insert portion in a direction substantially along the axis of the unfolding center narrows from the position at which the first insert portion and the second insert portion are connected.

In accordance with the present invention having the above-described structure, because the bag body expands toward a vehicle occupant when the vehicle suddenly decelerates, the upper wall portion of the air bag cover main body is pushed. As a result, the upper wall portion unfolds around a center of unfolding provided at the side wall portion, and the bag body is expanded. The first insert portion of the insert member is embedded in the upper wall portion by insert molding, and the second insert portion of the insert member is embedded in the side wall portion by insert molding. Therefore, the force applied to the upper wall portion when the upper wall portion expands is absorbed by the base plate via the insert member.

The second insert portion of the insert member is formed so as to be more narrow than the first insert portion. Therefore, even if the side wall portion of the air bag cover main body is formed in an arch-shape as described in the "Description of the Related Art", the insert member can be embedded linearly and without making the side wall portion too thick. Accordingly, the upper wall portion can be smoothly unfolded without the second insert portion offering resistance when the upper wall portion of the air bag cover unfolds.

Further, it is not the case that the second insert portion is merely provided so as to be more narrow than the first insert portion. In the present invention, the width of the second insert portion gradually becomes more narrow than the width of the first insert portion. Therefore, the bending of both end portions (i.e., the portions where the width of the second insert portion is deducted from the width of the first insert portion) of the first insert portion in directions of approaching each other when the upper wall portion unfolds, which occurs in a case in which the second insert portion is merely provided so as to be more narrow than the first insert portion, can be prevented.

The air bag cover structure relating to the present invention as described above has a superior effect in that, because the second insert portion is formed so as to become gradually more narrow with respect to the first insert portion, the degrees of freedom in design can be increased and the turning up or bending of the lateral sides of the insert portion can be prevented.

BRIEF DESCRIPTION OF THE ACCOMPANYING DRAWINGS

DETAILED DESCRIPTION OF THE PREFERRED EMBODIMENT

Figure 3:
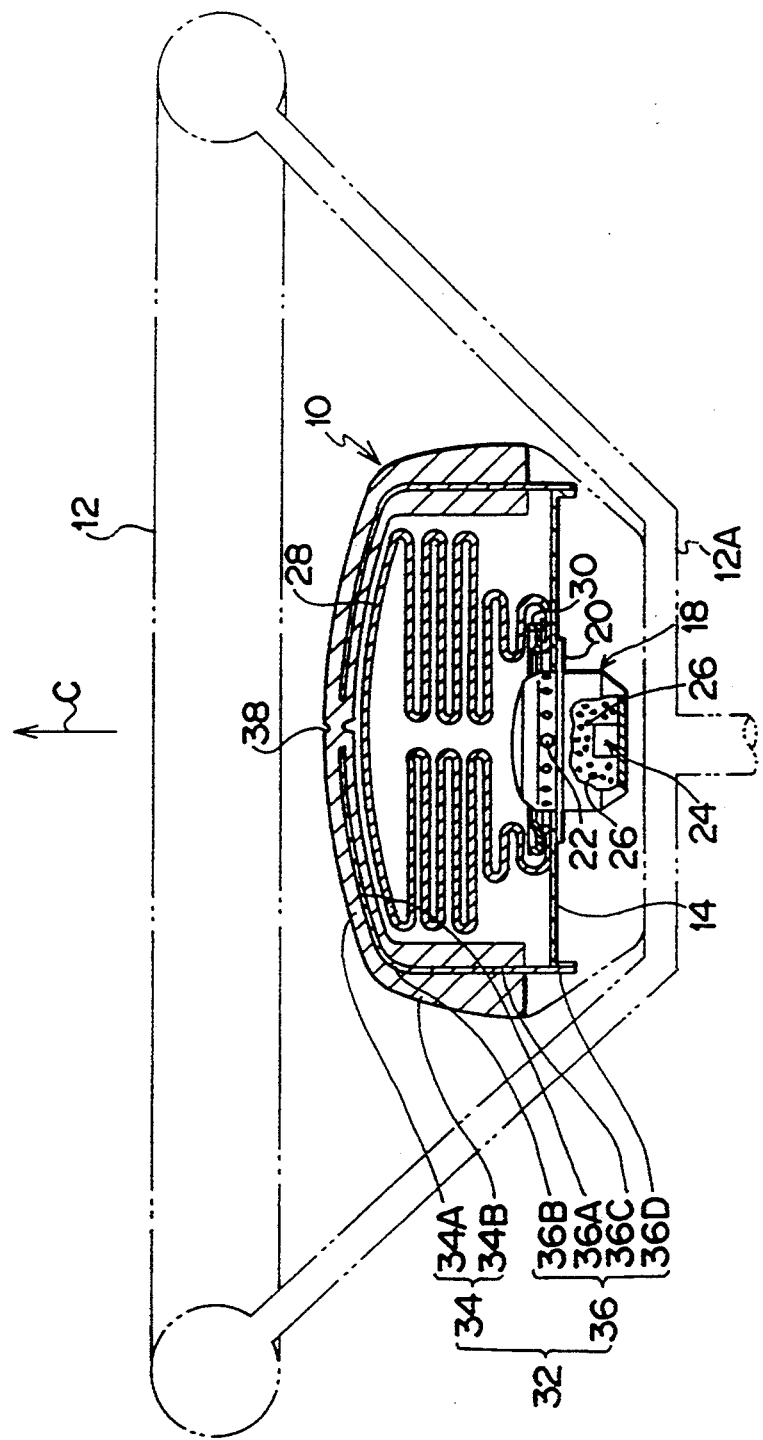
FIG. 3 is a schematic sectional view of the air bag apparatus provided with air bag cover shown in FIG. 1.

FIG. 3 shows a schematic sectional view of an air bag apparatus 10 in which an air bag cover structure according to the present invention is utilized.

Figure 1:
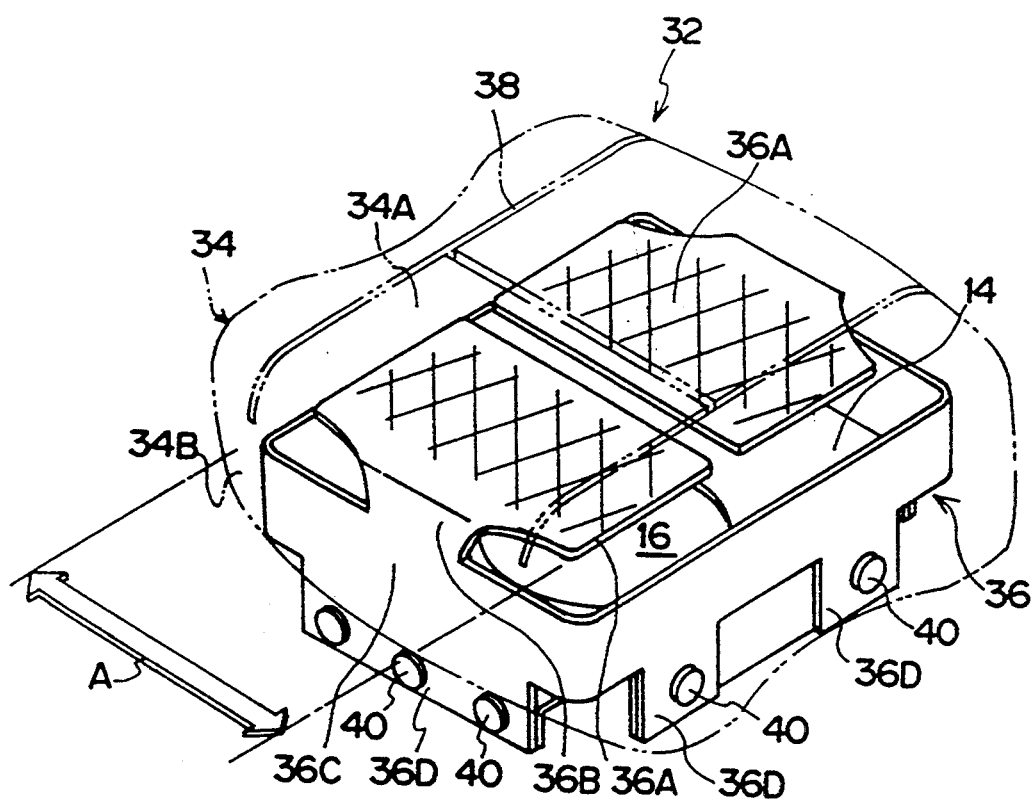
FIG. 1 is a perspective view showing an air bag cover structure according to an embodiment of the present invention mounted to a base plate of an air bag apparatus.

The air bag apparatus 10 is attached to a hub 12A of a steering wheel 12 of a vehicle. The air bag apparatus 10 has a base plate 14 of a box-like shape, the sides of which are bent in a direction away from the seat occupant (in the direction opposite to the direction indicated by an arrow C in FIG. 3). The base plate 14 has a circular insertion through hole 16, defined in a center portion 40 thereof, as shown in FIG. 1. A substantially cylindrical-shaped inflator 18 is inserted through the insertion hole 16 of the base plate 14 from the side opposite to the seat occupant, so that one end of the inflator extends therethrough. At a center portion of the inflator 18 in the axial direction, a flange 20 is integrally formed. Plural gas openings 22 are formed in the inflator 18 at predetermined intervals around the outer peripheral surface near the vehicle occupant. At a center portion of the inflator 18, an ignition device 24 is provided which ignites a detonator in a blasting cap (both not shown) when the vehicle suddenly decelerates. Further, a booster (not shown), a gas generating material 26 and the like fill a space surrounding the ignition device 24. Accordingly, when the vehicle suddenly decelerates, the ignition device 24 operates to ignite the detonator in the blasting cap. The burning of the detonator causes the burning of the gas generating material 26 via the burning of the booster so that a large amount of gas is generated.

A bag 28 is located on the side of the base plate 14 facing the seat occupant in a folded state. Around the peripheral edge of the opening of the bag 28, a ring plate 30 is provided which pushes the edge of the opening against the base plate 14. The ring plate 30 is fixed, together with the flange 20, to the base plate 14 by rivets or the like so as to maintain the attachment of the bag 28.

An air bag cover 32 having a box-like shape is provided around on the outer peripheral portion of the air bag 28. The air bag 28 is accommodated between the air bag cover 32 and the base plate 14.

Figure 4:
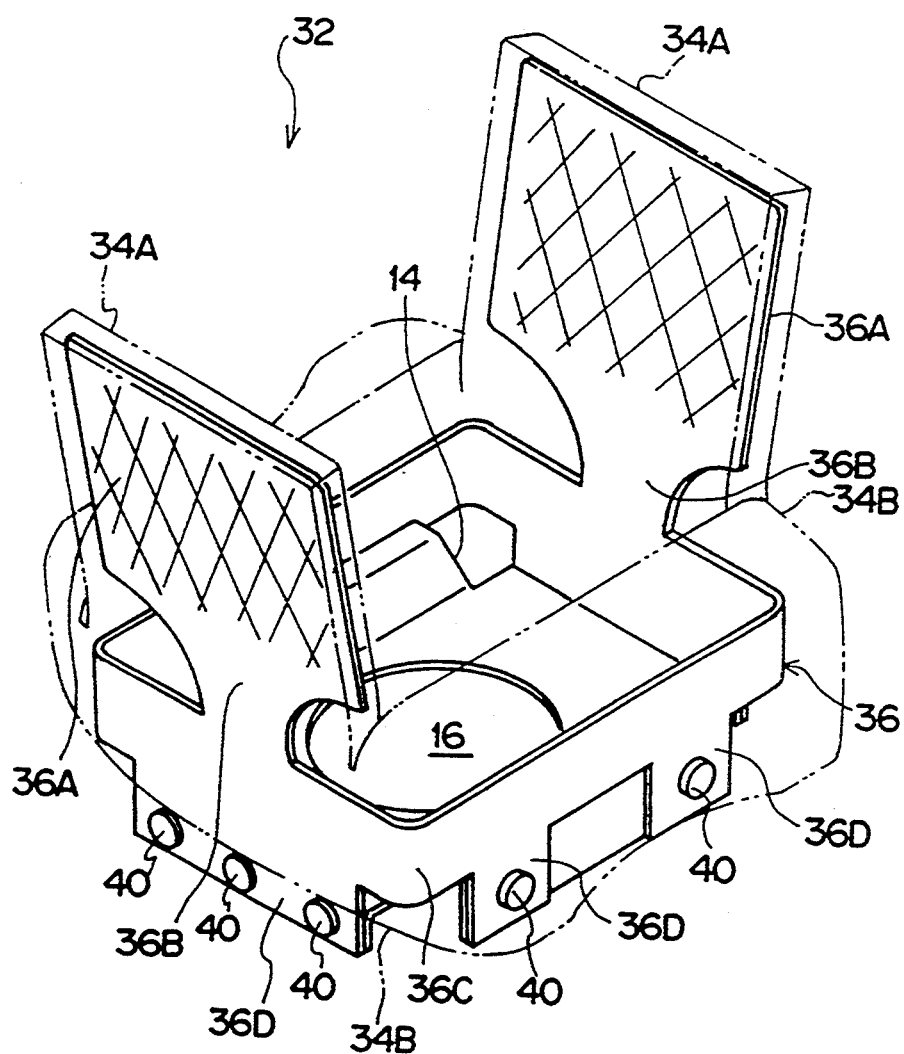
FIG. 4 is a perspective view showing the air bag cover of FIG. 1 which has ruptured in response to a sudden decrease in vehicle speed.

As shown in FIGS. 1, 3 and 4, the air bag cover 32 is comprised of an air bag cover main body 34, and an insert plate 36 which constitutes an insert member and is embedded within in the cover body 34.

Formed of a resin such as urethane is comprised of an upper wall 34A facing the seat occupant and a side wall 34B integrally provided thereto. The upper wall 34A has a thin portion 38 of a substantially H-shaped configuration when seen from the side of the occupant. When the vehicle suddenly decelerates, the bag 28 expands applying pressure to the thin portion 38 until it ruptures. this rupture causes the upper wall 34A to subdivide into two sections which open outward and opposite to each other (see FIG. 4). Meanwhile, the side wall 34B has a convex-shaped arched outer surfaces as seen from the occupants side thereby enhancing the appearance or design of the cover assembly 32.

As described above, the insert plate 36 is embedded in the air bag cover main body 34 by insert-molding. The insert plate 36 is made of a resin that is more rigid than the material of the air bag cover main body 34 to impart a desired stiffness. The insert plate 36 is comprised of a pair of first insert portions 36A embedded in the upper wall 34A at both sides of the thin wall portion 38, a pair of second insert portions 36B which are integrally formed with the first insert portions 36A and are embedded in the side wall 34B, a base portion 36C which is integrally formed with the second insert portions 36B, is in the form of a rectangular frame and is embedded in the side wall 34B, and a plurality of mounting portions 36D extending therefrom in the direction away from the seat occupant. The insert plate 36 is mounted to the base plate 14 by securing the mounting portions 36D to the base plate 14 by rivets 40.

The second insert portions 36B of the insert plate 36 act as foci for the opening movement of the two divided sections of the upper wall 34A which occurs when the upper wall 34A is ruptured. More specifically, when the upper wall 34A is ruptured by inflation of the bag 28, the two divided sections of the upper wall 34A and the respective first insert portions 36A embedded therein open outwardly with the second insert portions 36B acting as foci for the opening movement.

Figure 2:
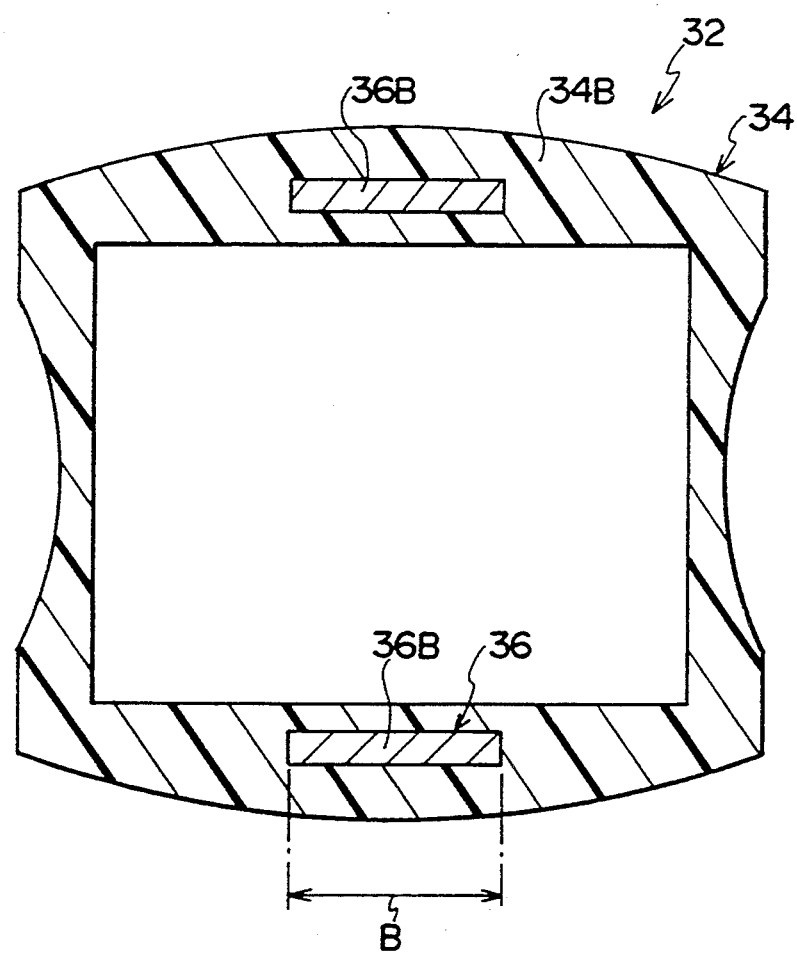
FIG. 2 is a sectional view of the air bag cover structure of FIG. 1 taken along a plane parallel to the upper wall of the cover structure.

The traverse dimension or width B of the second insert portions 36B (shown in FIG. 2) is narrower than the traverse dimension or width A of the first insert portions 36A (shown in FIG. 1). The width B of the second insert portions 36B gradually narrows as the distance from the first insert portions 36A increase and becomes the narrowest at the juncture of the second inset portions 36B and the base portion 36C. Each of the second insert portions 36B has mildly curved edges at both sides. As shown in FIG. 2, the second insert portions 36B embedded in the side wall 34B are straight and parallel to the corresponding inner surfaces of the side wall 34B.

Next, the operation of the present embodiment will be described.

Except for an event wherein the vehicle suddenly decelerates, the ignition device 24 is in an inactive state so that the air bag apparatus 10 does not operate.

On the other hand, when the vehicle suddenly decelerates, the ignition device 24 is activated to ignite the detonator in the blasting cap. The burning of the detonator causes the burning of the gas generating material via the burning of the booster so that a large amount of gas is generated. The generated gas jets through the gas openings 22 of the inflator 18, thereby inflating the bag 28. With the inflation of the bag 28, the air bag cover 32 is pressed from within by the bag 28, whereby the thin wall portion 38 is torn ruptured to form two divided sections of the upper wall 34A. As a result, the divided sections are opened like a biparting door, thereby allowing the bag to expand outward towards the seat occupant.

The load (i.e., expansion load) acting on the upper wall 34A of the air bag cover main body 34 is transmitted to the base portion 36C of the insert plate 36 via the first and second insert portions 36A and 36B, and then further transmitted to the base plate 14 via the mounting portions 36D, whereby the load is absorbed.

In the present embodiment, since the second insert portions 36B of the insert plate 36 have a width smaller than that of the first insert portions 36A, it is possible to embed the second insert portions 36B flat, even though the side wall 34B has convexly arched surfaces. Therefore, the second insert portions 36B of the insert plate 36 do not resist the opening movement of the divided portions of the upper wall 34A, and smooth opening of the divided sections of the upper wall 34A and the first insert portions 36A are thereby ensured.

Figure 8:
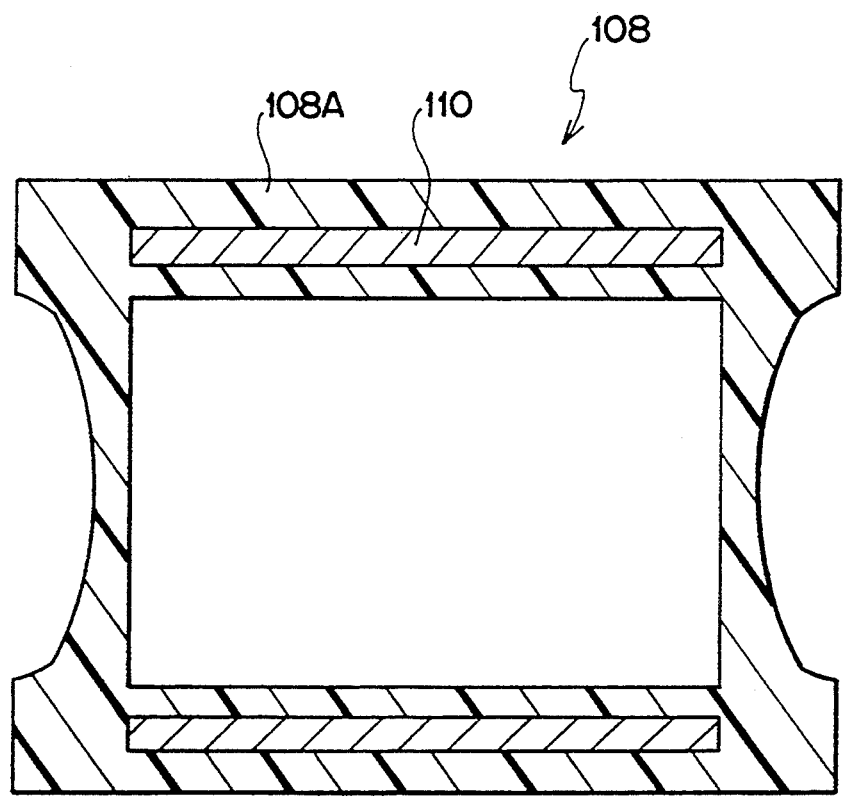
FIG. 8 is a sectional view, corresponding to FIG. 6, of still another conventional air bag cover.

In addition, since the side wall 34B is formed with convexly arched outer surfaces, the design of the air bag cover 32 can be facilitated. In the above-described embodiment, the air bag cover 32 which is provided with the side wall 34B having convexly arched surfaces is mentioned as an example. The insert plate 36, however, can be used in combination with an air bag cover 108, shown as prior art in FIG. 8 as having a side wall with flat or straight outer surfaces. This demonstrates that tile present invention broadens the range of design choices, thereby increasing the freedom or flexibility in designing the air bag cover 32.

Figure 5:
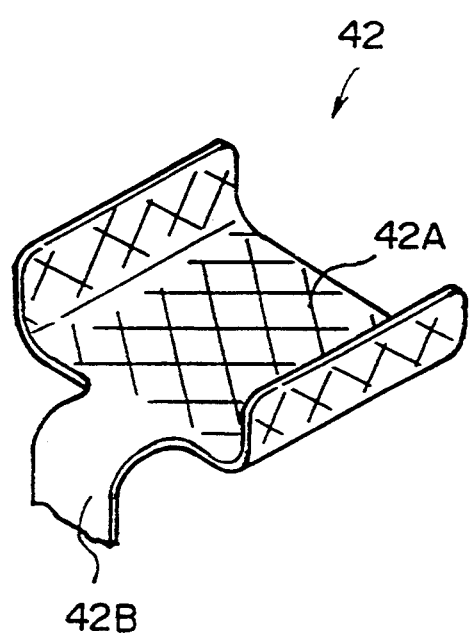
FIG. 5 is a perspective view of an insert plate whose formation is slightly different from the insert plate shown in FIG. 1 for demonstrating the effect of the embodiment.
Figure 6:
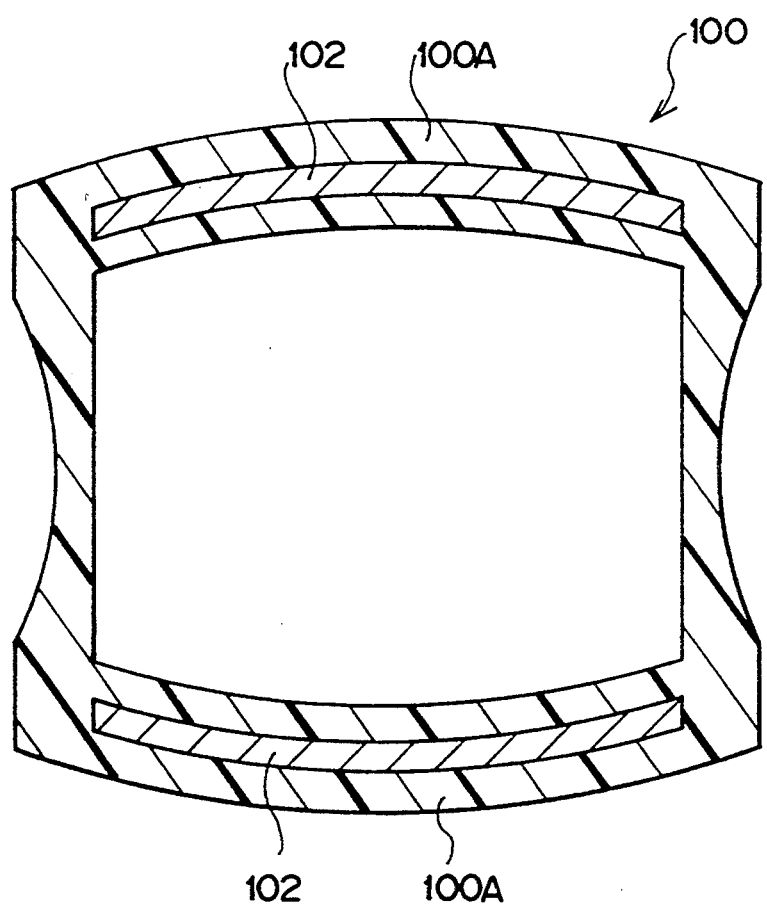
FIG. 6 is a sectional view, corresponding to FIG. 2, of a conventional air bag cover.
Figure 7:
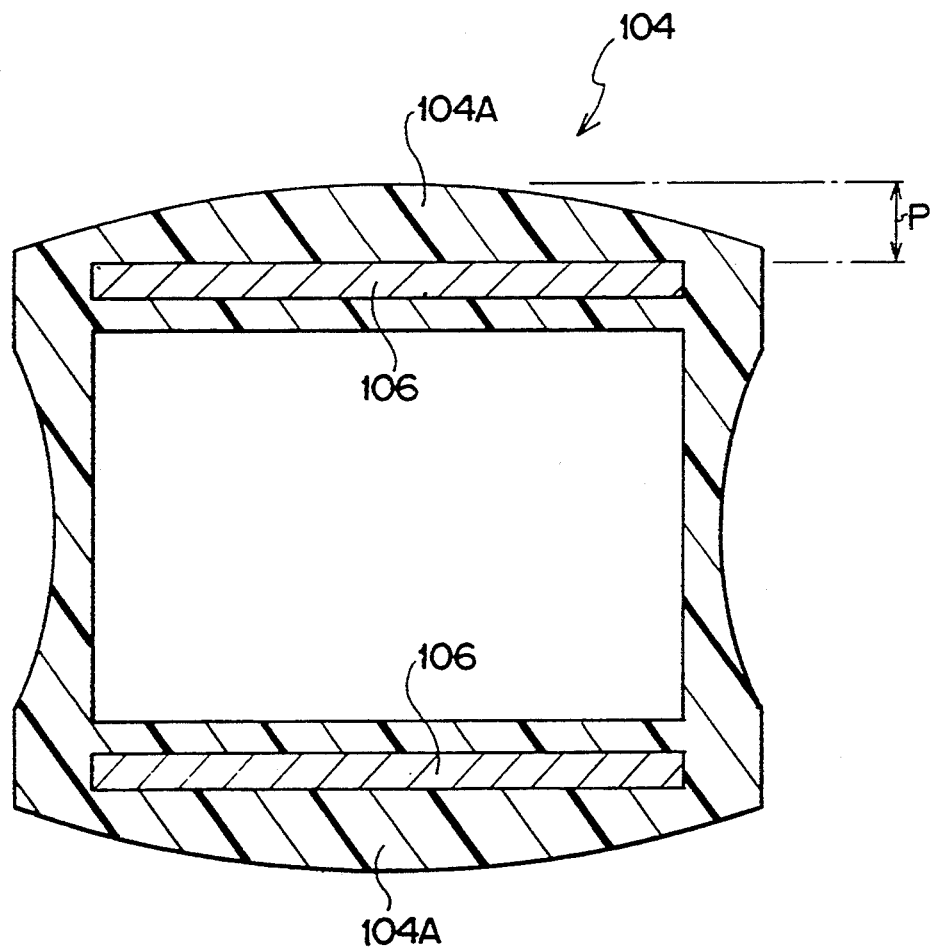
FIG. 7 is a sectional view, corresponding to FIG. 6, of another conventional air bag cover.

Moreover, since the second insert portion 36B gradually narrows in relation to the first insert portion 36A, it becomes possible to prevent the lateral side portions of the first insert portion 36A of the insert plate 36 from turning up or bending outward as shown in FIG. 5, even when the upper wall 34A is ruptured in response to a sudden deceleration of the vehicle. More specifically, when an insert plate 42 as shown in FIG. 5 has second insert portions 42B which are narrower than first insert portions 42A, it is predictable that the lateral sides of each of the first insert portion 42A will turn up or bend outward in the same direction when the upper wall 34A is ruptured in response to a sudden deceleration of the vehicle. On the contrary, when utilizing the insert plate 36 according to the present embodiment in which the second insert portions 36B gradually narrow in relation to the first insert portion 36A, the rigidity of the joined portions between the first insert portions 36A and the second insert portions 36B and portions adjacent thereto are increased slightly compared to the insert plate 42 shown in FIG. 5, thereby preventing the above-mentioned turning up or bending of the lateral side of 42A.

In the present invention, the insert plate 36 is a single piece in which the first insert portions 36A, second insert portions 36B, frame-like base portion 36C and mounting portions 36D are integrally formed. However, an insert plate may be formed as an assembly of two or four parts. For example, the frame-shaped base portion 36C may be manufactured from the other portions. Even in such cases, the same function and effect as those of the above-mentioned embodiment can be obtained.

What is claimed is:

1. An air bag cover structure comprising:
   an air bag cover main body having an upper wall portion, a bag body which inflates toward a vehicle occupant when a vehicle suddenly decelerates being accommodated between said upper wall portion and a base plate, said upper wall portion being pushed by said bag body, upon expansion so that said upper wall portion unfolds, and said air bag cover main body having a side wall portion which includes a center of unfolding of said upper wall portion when said upper wall portion unfolds; and
   an insert member having a first insert portion, which is embedded in said air bag cover main body by insert molding and which is positioned at said upper wall portion when said first insert portion is in an embedded state, and a second insert portion, which is provided integrally with said first insert portion and which is positioned at said side wall portion so as to be supported by said base plate when said second insert portion is embedded in said air bag cover main body,
   wherein a length of said second insert portion in a direction substantially along an axis of the center of unfolding continuously narrows from a position at which said first insert portion and said second insert portion are connected towards said base plate such that said second insert portion has gradually curving edges.

2. An air bag cover structure according to claim 1, wherein a horizontal cross sectional configuration of said second insert portion in a vicinity of the center of unfolding is substantially rectangular.

3. An air bag cover structure according to claim 1, wherein said insert member is formed of a material having a higher rigidity than a material of said air bag cover main body.

4. An air bag cover structure according to claim 1, wherein said insert member has a base portion embedded in said side wall portion, said base portion connecting said second insert portion and said base plate.

5. An air bag cover structure according to claim 4, wherein said base portion is provided integrally with said first insert portion and said second insert portion.

6. An air bag cover structure according to claim 4, wherein a horizontal cross sectional configuration of said base portion is a substantially rectangular frame.

7. An air bag cover structure according to claim 1, wherein said upper wall portion has a weak portion, said weak portion being provided along at least a portion of an outer configuration of said first insert portion and breaking due to pushing of said bag body, upon expansion so as to allow unfolding of said upper wall portion.

8. An air bag structure according to claim 1, wherein a pair of said first insert portions and second insert portions are provided, and when said upper wall portion unfolds, said pair of first insert portions unfold toward the vehicle occupant with a substantial center of said upper wall portion as a boundary between said pair of said first insert portions and said second insert portions.

9. An air bag cover structure according to claim 1, wherein an outer peripheral configuration of a portion of said side wall portion provided in a vicinity of the center of unfolding is a substantial arc-shape which projects outwardly.

10. An insert member embedded in an air bag cover by insert molding, said air bag cover having an upper wall portion, a bag body which inflates toward a vehicle occupant when a vehicle suddenly decelerates being accommodated between said upper wall portion and a base plate, said upper wall portion being pushed by said bag body, upon expansion so that said upper wall portion unfolds, and said airbag cover having a side wall portion which includes a center of unfolding of said upper wall portion when said upper wall portion unfolds, said insert member comprising:
   a first insert portion for positioning at said upper wall portion; and
   a second insert portion provided integrally with said first insert portion and positioned at said side wall portion so as to be supported by said base plate when said second insert portion is embedded in said air bag cover, a length of said second insert portion in a direction substantially along an axis of the center of unfolding continuously narrows from a position at which said first insert portion and said second insert portion are connected towards said base plate such that said second insert portion has gradually curving edges.

11. An insert member according to claim 10, wherein a horizontal cross sectional configuration of said second insert portion in a vicinity of the center of unfolding is substantially rectangular.

12. An insert member according to claim 10, wherein said first insert portion and said second insert portion are formed of materials having respective rigidities which are higher than a rigidity of a material of said air bag cover.

13. An insert member according to claim 10, further comprising:
   a base member for embedding in said side wall portion and connecting said second insert portion and said base plate.

14. An insert member according to claim 13, wherein said base member is provided integrally with said first insert portion and said second insert portion.

15. An insert member according to claim 13, wherein a horizontal cross sectional configuration of said base member is a substantially rectangular frame.

16. An insert member according to claim 10, wherein a pair of said first insert portions and second insert portions are provided, and when said upper wall portion unfolds, said pair of first insert portions unfold toward the vehicle occupant with a substantial center of said upper wall portion as a boundary between said pair of said first insert portions and said second insert portions.

17. An air bag comprising:
   a base plate for mounting to a vehicle;
   an air bag cover main body having an unfolding upper wall portion and a stationary, substantially arcuate side wall portion, said air bag cover having a center of unfolding of said upper wall portion when said upper wall portion unfolds;
   a bag body which inflates toward a vehicle occupant when the vehicle suddenly decelerates, said bag provided between said upper wall portion and said base plate, said upper wall portion being pushed by said bag body upon expansion such that said upper wall portion unfolds;
   an insert member having a first insert portion embedded in said air bag cover main body by insert molding and positioned at said upper wall portion, and a second insert portion provided integrally with said first insert portion and positioned at said side wall portion so as to be supported by said base plate,
   wherein a length of said second insert portion in a direction substantially along an axis of the center of unfolding continuously narrows from a position at which said first insert portion and said second insert portion are connected towards said base plate such that said second insert portion has gradually curving edges.

18. An insert member according to claim 17, wherein said first insert portion and said second insert portion are formed of materials having respective rigidities which are higher then a rigidity of a material of said air bag cover.

19. An insert member according to claim 17, further comprising:
   a base member for embedding in said side wall portion and connecting said second insert portion and said base plate.

20. An insert member according to claim 19, wherein said base member is provided integrally with said first insert portion and said second insert portion.

* * * * *